(12) United States Patent
Heiredal-Clausen et al.

(10) Patent No.: US 10,074,864 B2
(45) Date of Patent: Sep. 11, 2018

(54) GAS INLET FOR SOEC UNIT

(71) Applicant: Haldor Topsøe A/S, Kgs. Lyngby (DK)

(72) Inventors: Thomas Heiredal-Clausen, Copenhagen (DK); Casper Buchholtz Frederiksen, Tikøb (DK)

(73) Assignee: Haldor Topsoe A/S, Lyngby (DK)

( * ) Notice: Subject to any disclaimer, the term of this patent is extended or adjusted under 35 U.S.C. 154(b) by 305 days.

(21) Appl. No.: 14/888,599

(22) PCT Filed: May 2, 2013

(86) PCT No.: PCT/EP2013/059131
§ 371 (c)(1),
(2) Date: Nov. 2, 2015

(87) PCT Pub. No.: WO2014/177212
PCT Pub. Date: Nov. 6, 2014

(65) Prior Publication Data
US 2016/0079617 A1    Mar. 17, 2016

(51) Int. Cl.
| | | |
|---|---|---|
| *C25B 9/00* | (2006.01) |
| *C25B 9/18* | (2006.01) |
| *C25B 15/08* | (2006.01) |
| *H01M 8/02* | (2016.01) |
| *H01M 8/04* | (2016.01) |
| *H01M 8/12* | (2016.01) |
| *H01M 8/24* | (2016.01) |
| *H01M 8/04082* | (2016.01) |
| *H01M 8/2425* | (2016.01) |
| *H01M 8/0258* | (2016.01) |
| *H01M 8/0202* | (2016.01) |
| *H01M 8/1246* | (2016.01) |
| *H01M 8/2483* | (2016.01) |

(Continued)

(52) U.S. Cl.
CPC ........... *H01M 8/04201* (2013.01); *C25B 9/00* (2013.01); *C25B 9/18* (2013.01); *C25B 15/08* (2013.01); *H01M 8/0202* (2013.01); *H01M 8/0258* (2013.01); *H01M 8/1246* (2013.01); *H01M 8/24* (2013.01); *H01M 8/2425* (2013.01); *H01M 8/2428* (2016.02); *H01M 8/2483* (2016.02); *H01M 2008/1293* (2013.01)

(58) Field of Classification Search
CPC . C25B 9/00; C25B 9/18; C25B 15/08; H01M 8/0202; H01M 8/0258; H01M 8/04201; H01M 8/1246; H01M 8/24; H01M 8/2425; H01M 8/2428; H01M 8/2483; H01M 2008/1293
See application file for complete search history.

(56) References Cited

U.S. PATENT DOCUMENTS

| | | |
|---|---|---|
| 6,492,053 B1 | 12/2002 | Donelson et al. |
| 2003/0235749 A1 | 12/2003 | Haltiner, Jr. et al. |
| 2005/0181264 A1 | 8/2005 | Clauss |

(Continued)

FOREIGN PATENT DOCUMENTS

| | | |
|---|---|---|
| CN | 1503998 A | 6/2004 |
| CN | 1264240 C | 7/2006 |

(Continued)

*Primary Examiner* — Ciel P Thomas
(74) *Attorney, Agent, or Firm* — Blank Rome LLP

(57) ABSTRACT

Multiple gas inlet or outlets for a SOC unit is provided by stacked layers with cut outs for gas channels which overlap.

12 Claims, 6 Drawing Sheets

(51) Int. Cl.
*H01M 8/2428* (2016.01)
*H01M 8/124* (2016.01)

(56) References Cited

U.S. PATENT DOCUMENTS

| | | |
|---|---|---|
| 2005/0255367 A1 | 11/2005 | Takahashi et al. |
| 2006/0154125 A1* | 7/2006 | Na ............... H01M 8/0247 429/439 |
| 2009/0042081 A1 | 2/2009 | Kotani et al. |
| 2009/0325023 A1* | 12/2009 | Kusnezoff ......... H01M 8/0206 429/422 |
| 2010/0297535 A1 | 11/2010 | Das et al. |

FOREIGN PATENT DOCUMENTS

| | | |
|---|---|---|
| CN | 101253647 A | 8/2008 |
| CN | 105393394 A | 3/2016 |
| DE | 10 2010 020 178 A1 | 11/2011 |
| EP | 1 760 817 A1 | 3/2007 |
| JP | H 10-172594 A | 6/1998 |
| JP | 2006-100212 A | 4/2006 |
| JP | 2006-269409 A | 10/2006 |
| JP | 2009-37889 A | 2/2009 |
| JP | 2009-193765 A | 8/2009 |
| JP | 2011-222152 A | 11/2011 |

* cited by examiner

GAS INLET FOR SOEC UNIT

FIELD OF THE INVENTION

The invention relates to a gas inlet for a solid oxide cell (SOC) unit, in particular a solid oxide fuel cell (SOFC) unit or an solid oxide electrolysis cell (SOEC) unit, in particular for a SOC unit comprised in a SOC stack.

BACKGROUND OF THE INVENTION

A Solid Oxide Fuel Cell (SOFC) comprises a solid electrolyte that enables the conduction of oxygen ions, a cathode where oxygen is reduced to oxygen ions and an anode where hydrogen is oxidised. The overall reaction in a SOFC is that hydrogen and oxygen electrochemically react to produce electricity, heat and water. In order to produce the required hydrogen, the anode normally possesses catalytic activity for the steam reforming of hydrocarbons, particularly natural gas, whereby hydrogen, carbon dioxide and carbon monoxide are generated. Steam reforming of methane, the main component of natural gas, can be described by the following equations:

$$CH_4 + H_2O \rightarrow CO + 3H_2$$

$$CH_4 + CO_2 \rightarrow 2CO + 2H_2$$

$$CO + H_2O \rightarrow CO_2 + H_2$$

During operation an oxidant such as air is supplied to the solid oxide fuel cell in the cathode region. Fuel such as hydrogen is supplied in the anode region of the fuel cell. Alternatively, a hydrocarbon fuel such as methane is supplied in the anode region, where it is converted to hydrogen and carbon oxides by the above reactions. Hydrogen passes through the porous anode and reacts at the anode/electrolyte interface with oxygen ions generated on the cathode side that have diffused through the electrolyte. Oxygen ions are created in the cathode side with an input of electrons from the external electrical circuit of the cell.

To increase voltage, several cell units are assembled to form a stack and are linked together by interconnects. Interconnects serve as a gas barrier to separate the anode (fuel) and cathode (air/oxygen) sides of adjacent cell units, and at the same time they enable current conduction between the adjacent cells, i.e. between an anode of one cell with a surplus of electrons and a cathode of a neighbouring cell needing electrons for the reduction process. Further, interconnects are normally provided with a plurality of flow paths for the passage of fuel gas on one side of the interconnect and oxidant gas on the opposite side. To optimize the performance of a SOFC stack, a range of positive values should be maximized without unacceptable consequence on another range of related negative values which should be minimized. Some of these values are:

| VALUES TO BE MAXIMIZED | VALUES TO BE MINIMIZED |
| --- | --- |
| Fuel utilization | Price |
| electrical efficiency | Dimensions |
| life time | (temperature, to a point) |
| | production time |
| | fail rate |
| | number of components |
| | Parasitic loss (heating, cooling, blowers . . . ) |

Almost all the above listed values are interrelated, which means that altering one value will impact other values. Some relations between the characteristics of gas flow in the fuel cells and the above values are mentioned here:
Fuel Utilization:
The flow paths on the fuel side of the interconnect should be designed to seek an equal amount of fuel to each cell in a stack, i.e. there should be no flow- "short-cuts" through the fuel side of the stack.
Parasitic Loss:
Design of the process gas flow paths in the SOFC stack and its fuel cell units should seek to achieve a low pressure loss per flow volume at least on the air side and potentially on the fuel side of the interconnect, which will reduce the parasitic loss to blowers.
Electric Efficiency:
The interconnect leads current between the anode and the cathode layer of neighbouring cells. Hence, to reduce internal resistance, the electrically conducting contact points (hereafter merely called "contact points") of the interconnect should be designed to establish good electrically contact to the electrodes (anode and cathode) and the contact points should no where be far apart, which would force the current to run through a longer distance of the electrode with resulting higher internal resistance.
Lifetime:
Depends in relation to the interconnect, on even flow distribution on both fuel and air side of the interconnect, few components and even protective coating on the materials among others.
Price:
The interconnects price contribution can be reduced by not using noble materials, by reducing the production time of the interconnect and minimizing the material loss.
Dimensions:
The overall dimensions of a fuel stack is reduced, when the interconnect design ensures a high utilization of the active cell area. Dead-areas with low fuel- or air flow should be reduced and inactive zones for sealing surfaces should be minimized.
Temperature:
The temperature should be high enough to ensure catalytic reaction in the cell, yet low enough to avoid accelerated degradation of the cell components. The interconnect should therefore contribute to an even temperature distribution giving a high average temperature without exceeding the maximum temperature.
Production Time.
Production time of the interconnect itself should be minimized and the interconnect design should also contribute to a fast assembling of the entire stack. In general, for every component the interconnect design renders unnecessary, there is a gain in production time.
Fail Rate.
The interconnect production methods and materials should permit a low interconnect fail rate (such as unwanted holes in the interconnect gas barrier, uneven material thickness or characteristics). Further the fail-rate of the assembled cell stack can be reduced when the interconnect design reduces the total number of components to be assembled and reduces the length of seal surfaces.
Number of Components.
Apart from minimizing errors and assembling time as already mentioned, a reduction of the number of components leads to a reduced price.

The way the anode and cathode gas flows are distributed in a SOFC stack is by having a common manifold for each of the two process gasses. The manifolds can either be internal or external. The manifolds supply process gasses to the individual layers in the SOFC stack by the means of channels to each layer. The channels are normally situated in one layer of the repeating elements which are comprised in the SOFC stack, i.e. in the spacers or in the interconnect.

Spacers or interconnects normally have one inlet channel which is stamped, cut or etched all the way through the material. The reason for only having one inlet channel is that the spacer has to be an integral component. This solution allows for a cheap and controllable manufacturing of the spacer or interconnect channel, because controllable dimensions give controllable pressure drops.

Another way of making process gas channels, which allows for multi channels, is by etching, coining, pressing or in other ways making a channel partly through the spacer or interconnect. This means that the spacer can be an integral component, but the method of making the channels partly through the material is not precise, which gives an uncertain and uncontrollable pressure-drop in the gas channels.

If a sealing material is applied across gas channels which are formed only partly through the material of the spacer or the interconnect, more uncertain and uncontrollable pressure-drops in the gas channels will arise. The sealing material can of course be screen printed to match only the desired surfaces, or glued and cut away from the gas channels, which will lower the risk of uncertain pressure-drops, but this is expensive and time-consuming.

U.S. Pat. No. 6,492,053 discloses a fuel cell stack including an interconnect and a spacer. Both, the interconnect and the spacer, have inlet and outlet manifolds for the flow of oxygen/fuel. The inlet and outlet manifolds have grooves/passages on its surface for the distribution of oxygen/fuel along the anode and cathode. However, the grooves/passages of the interconnect and spacer are not aligned with each other and hence their geometries could not be combined to achieve multiple inlet points. Also, since the grooves/passages are on the surface of both the interconnect and spacers, the formation of multiple inlet points are not feasible.

US2010297535 discloses a bipolar plate of a fuel cell with flow channels. The flow plate has multiple channels for distributing fluid uniformly between the active area of the fuel cell. The document does not describe a second layer and similar channels within it.

US2005016729 discloses a ceramic fuel cell(s) which is supported in a heat conductive interconnect plate, and a plurality of plates form a conductive heater named a stack. Connecting a plurality of stacks forms a stick of fuel cells. By connecting a plurality of sticks end to end, a string of fuel cells is formed. The length of the string can be one thousand feet or more, sized to penetrate an underground resource layer, for example of oil. A pre-heater brings the string to an operating temperature exceeding 700 DEG C., and then the fuel cells maintain that temperature via a plurality of conduits feeding the fuel cells fuel and an oxidant, and transferring exhaust gases to a planetary surface. A manifold can be used between the string and the planetary surface to continue the plurality of conduits and act as a heat exchanger between exhaust gases and oxidants/fuel.

None of the above described known art provides a simple, efficient and fail-safe solution to the above described problems.

Therefore, with reference to the above listed considerations, there is a need for a robust, simple, cheap and easy to produce and handle, multi-channel gas inlet solution to provide an efficient and fail minimizing gas inlet for an SOFC unit. As corresponding cell units can also be used for solid oxide electrolysis, this gas inlet solution can also be used for a SOEC unit, hence a solution is sought for a SOC unit.

These and other objects are achieved by the invention as described below.

SUMMARY OF THE INVENTION

A fuel cell or electrolysis cell stack comprises repeating elements which are in each of the cells. By using two layers of the repeating elements in a cell stack to make the inlet channels for the cells, it is possible to make simple, coherent components with multi-channel inlets.

The invention is to have different channels in two layers which overlap in a way that directs the flow from the channel in one component to one or advantageously in particular to a plurality of channels in the other component and then into the active area of the cells in the stack. According to this principle, it is possible to make multi channels into every repeating element in the cell stack with coherent components that are easy to handle.

FEATURES OF THE INVENTION

1. Solid oxide electrolysis cell stack comprising a plurality of stacked cell units, each unit comprises a cell layer and an interconnect layer, wherein one interconnect layer separates one cell unit from the adjacent cell unit in the cell stack, wherein at least one of said layers in at least one cell unit has at least one primary gas inlet opening and wherein at least one adjacent layer in the same cell unit has at least one secondary gas inlet opening, wherein said primary gas inlet opening and said secondary gas inlet opening partly overlap, the overlap defines a common gas inlet zone where inlet gas flows from the primary gas inlet opening to the secondary gas inlet opening.
2. Solid oxide electrolysis cell stack according to feature 1, wherein the layer comprising the at least one primary gas inlet opening and the layer comprising the at least one secondary gas inlet opening are coherent.
3. Solid oxide electrolysis cell stack according to any of the preceding features, wherein the layer comprising the at least one secondary gas inlet opening further comprise at least one protrusion forming at least one gas inlet flow guide.
4. Solid oxide electrolysis cell stack according to feature 3, wherein said at least one gas inlet flow guide at least partly overlaps a part of said at least one primary gas inlet opening and thereby forms at least one multiple channel gas inlet.
5. Solid oxide electrolysis cell stack according to any of the preceding features, wherein at least one of said layers in at least one cell unit has at least one primary gas outlet opening and wherein at least one adjacent layer in the same cell unit has at least one secondary gas outlet opening, wherein said primary gas outlet opening and said secondary gas outlet opening partly overlap, the overlap defines a common gas outlet zone where outlet gas flows from the primary gas outlet opening to the secondary gas outlet opening.
6. Solid oxide electrolysis cell stack according to feature 5, wherein the layer comprising the at least one secondary gas outlet opening further comprise at least one protrusion forming at least one gas outlet flow guide.
7. Solid oxide electrolysis cell stack according to feature 6, wherein said at least one gas outlet flow guide at least partly overlaps a part of said at least one primary gas outlet opening and thereby forms at least one multiple channel gas outlet.
8. Solid oxide electrolysis cell stack according to any of the preceding features, wherein said unit further comprises at least one spacer layer.
9. Solid oxide electrolysis cell stack according to any of the preceding features, wherein the at least one primary gas inlet opening or the at least one primary gas outlet opening is a cut through hole, a cut through opening, an indentation or a combination of these.
10. Solid oxide electrolysis cell stack according to any of the preceding features, wherein the at least one secondary gas inlet opening or the at least one secondary gas outlet opening is a cut through hole, a cut through opening, an indentation or a combination of these.
11. Solid oxide electrolysis cell stack according to any of the preceding features, wherein the at least one primary gas inlet opening or the at least one primary gas outlet opening is located in the interconnect layer.
12. Solid oxide electrolysis cell stack according to any of the preceding features, wherein the at least one secondary gas inlet opening or the at least one secondary outlet opening is located in the at least one spacer layer.
13. Method for channelling inlet gas to a cell unit in a solid oxide electrolysis cell stack comprising a plurality of stacked cell units, each unit comprises a cell layer and an interconnect layer, wherein one interconnect layer separates one cell unit from the adjacent cell unit in the cell stack, wherein at least one of said layers in at least one cell unit has at least one primary gas inlet opening and at least one adjacent layer in the same cell unit has at least one secondary gas inlet opening, wherein said primary gas inlet opening and said secondary gas inlet opening partly overlap, the overlap defines a common gas inlet zone, the method comprising the steps of,
    providing an inlet gas to the at least one primary gas inlet opening
    flowing the inlet gas in a first direction through said primary gas inlet opening
    flowing the inlet gas in a second direction through a common gas inlet zone
    flowing the inlet gas in a third direction through the at least one secondary inlet gas opening
14. Method according to feature 13, wherein the second direction overall is in a different from the first and the third direction.
15. Method according to feature 13 or 14, wherein the third direction overall is in the same two dimensional plane as the at least one cell layer.
16. Method according to any of the features 13-15, wherein the angel between the second direction overall and the at least one cell layer is at least 5°, preferably at least 30°.
17. Method according to any of the features 13-16, wherein the at least one primary gas inlet opening is located in the interconnect layer.
18. Method according to any of the features 13-17, wherein said unit further comprises at least one spacer layer.
19. Method according to feature 18, wherein the at least one secondary gas inlet opening is located in the at least one spacer layer.
20. Method according to any of the features 13-19, wherein the at least one primary gas inlet opening is a cut through hole, a cut through opening, an indentation or a combination of these.
21. Method according to any of the features 13-20, wherein the inlet gas is an anode gas or a cathode gas.

BRIEF DESCRIPTION OF THE DRAWINGS

The invention is further illustrated by the accompanying drawings showing examples of embodiments of the invention.

DETAILED DESCRIPTION

In an embodiment of the invention, the gas channels in the layers, spacer, interconnect and cell is cut all the way through and will be in one coherent component.

Figure 1:
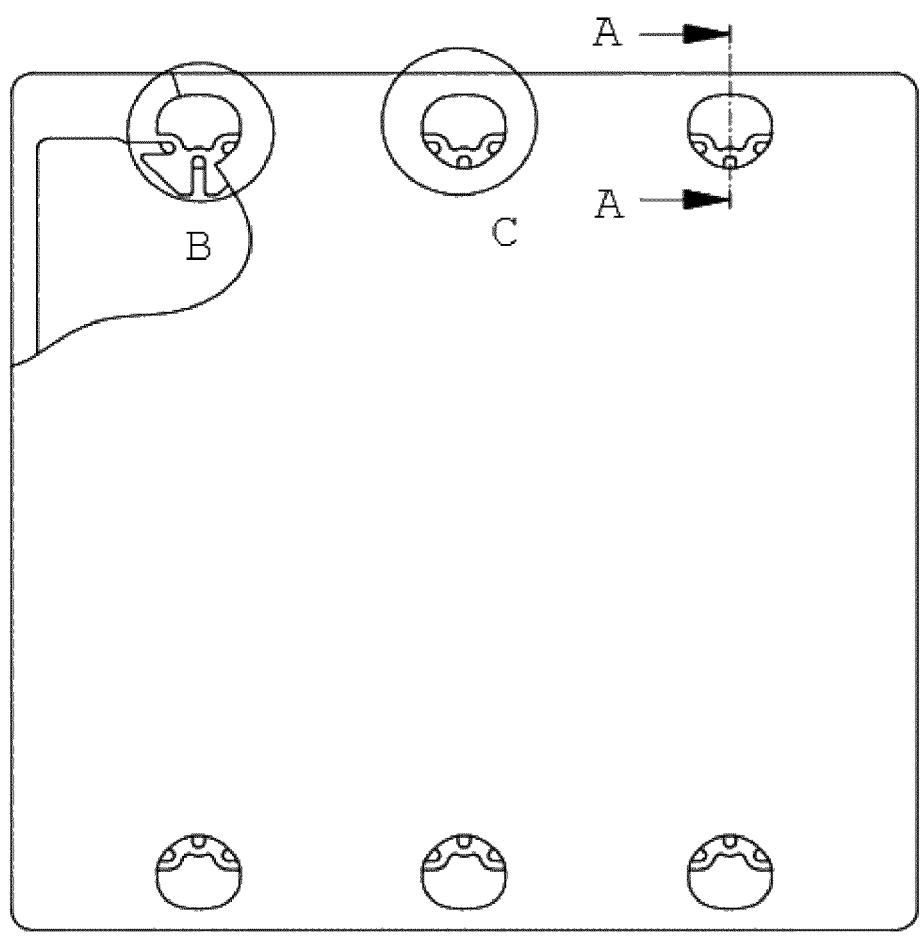
FIG. 1 shows a bottom view of an assembled repeating element of a solid oxide cell with a part of the bottom layer cut out.
Figure 2:
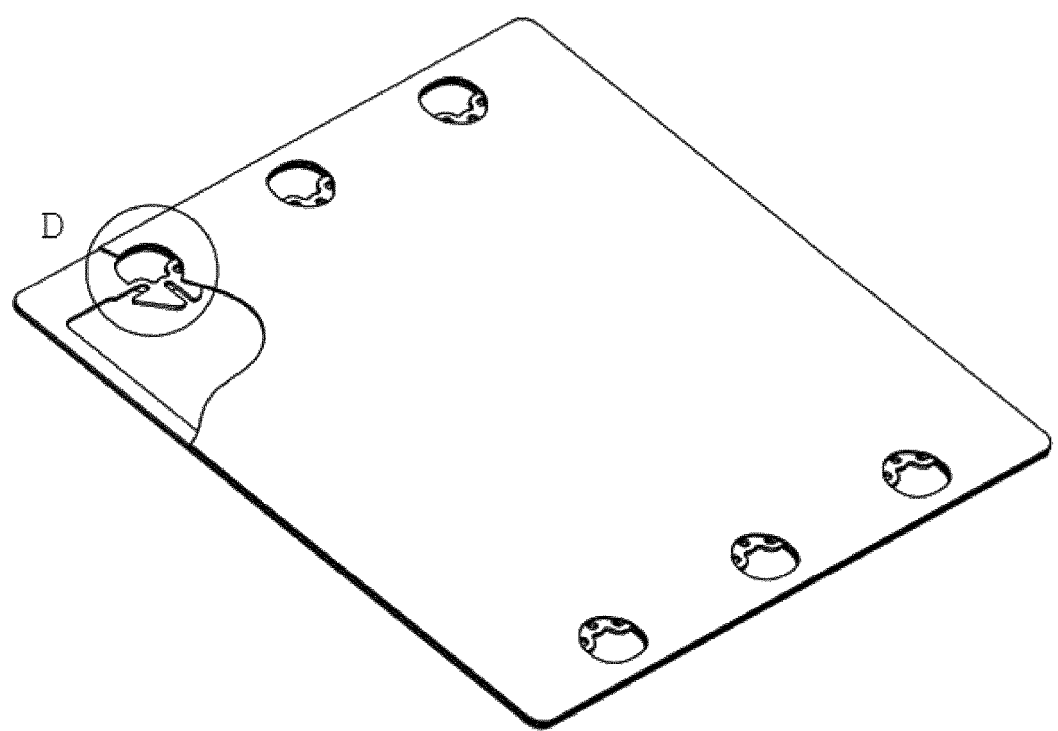
FIG. 2 shows the repeating element of FIG. 1 in isometric view.

FIG. 1 shows a bottom view of an assembled repeating element of a solid oxide cell with a part of the bottom layer cut out. The same view is shown on FIG. 2, only isometric. The bottom layer may be a cell comprising electrolyte and electrodes, as can be seen, six cut outs for gas channels are present which may be gas inlets or outlets or both. The layer on top of the bottom layer, in this embodiment a spacer, has different channels than the top layer. Each of the six gas channel cut outs in the spacer are smaller than the coherent cut out in the bottom layer, but in relation to each of the cut outs in the spacer there are "wings" which partly overlap the larger cut outs in the bottom layer and thereby forms multi-channel inlets or outlets when the layers are assembled in the cell stack.

Figure 4:
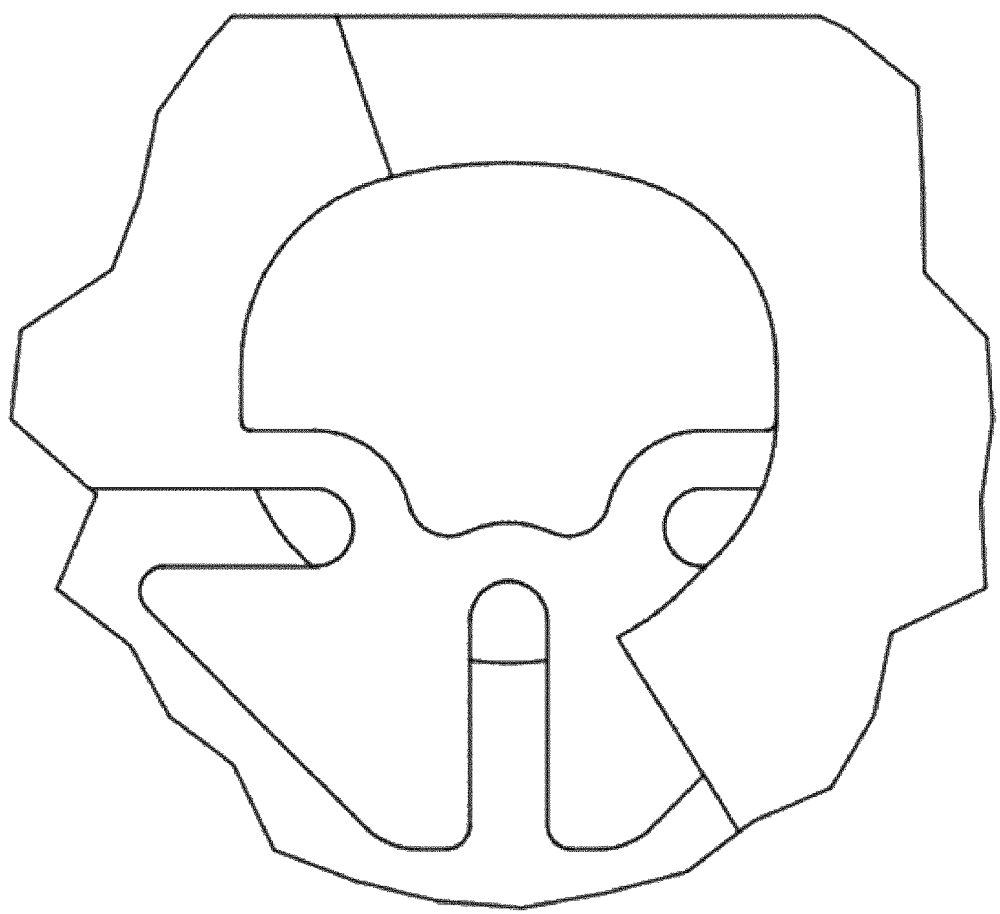
FIG. 4 shows an enlarged view of a part (B) of the repeating element of FIG. 1.
Figure 5:
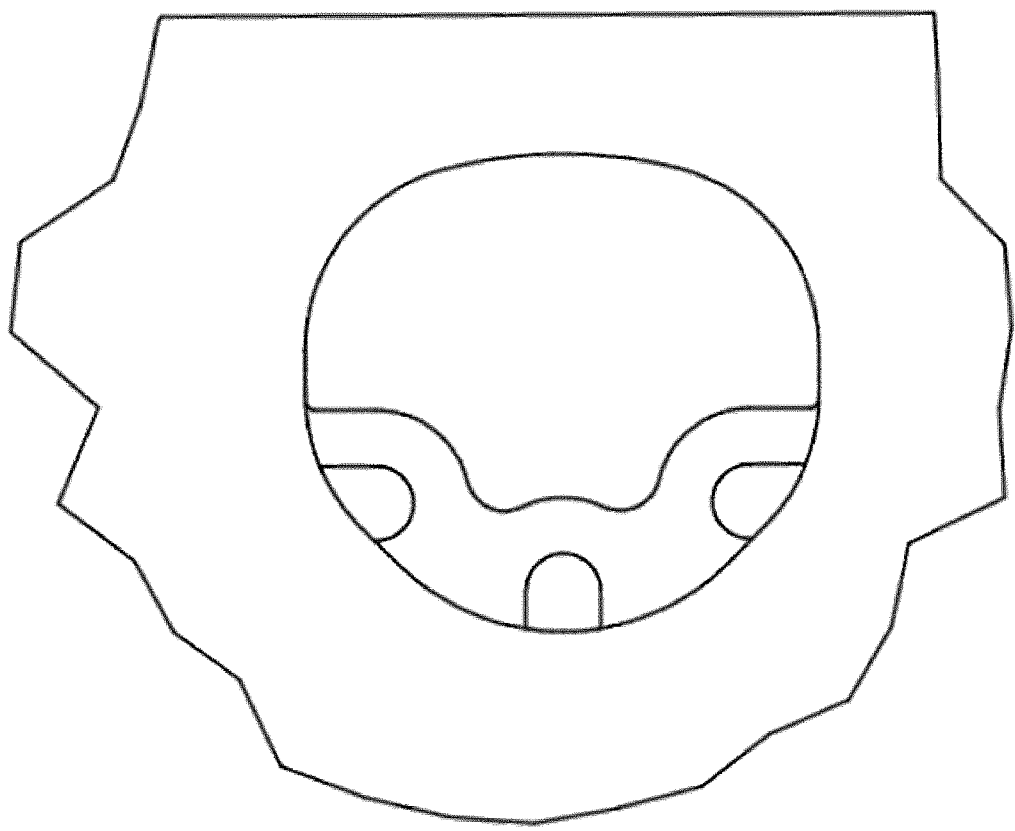
FIG. 5 shows an enlarged view of a part (C) of the repeating element of FIG. 1.

In FIG. 1 the first part of the multi-channels which overlap the cut outs in the bottom layer is visible through each of the five cut outs (more clearly seen in the enlarged view "C" in FIG. 5) and on the sixth cut out in the part of the figure named "B" all of some of the multi-channels are visible due to the cut away of a part of the bottom layer. This is more clearly shown in the enlarged view "B" in FIG. 4.

Figure 3:
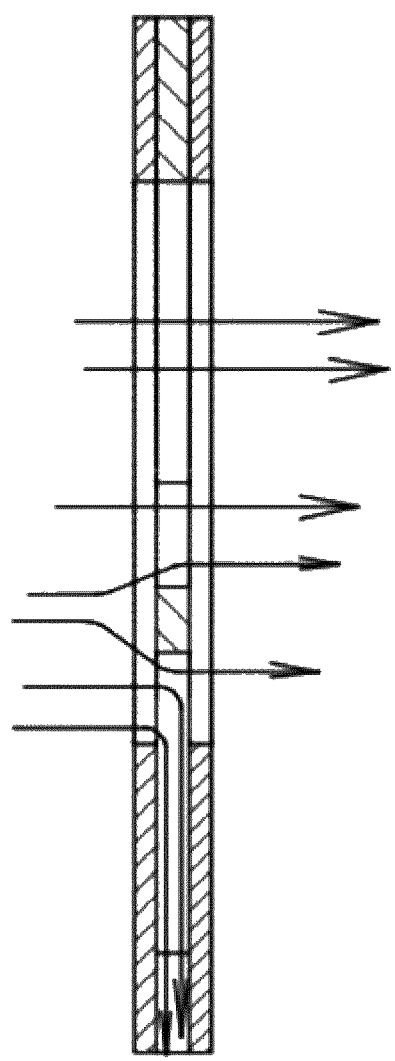
FIG. 3 shows a side cut A-A of a part of the repeating element of FIG. 1.
Figure 6:
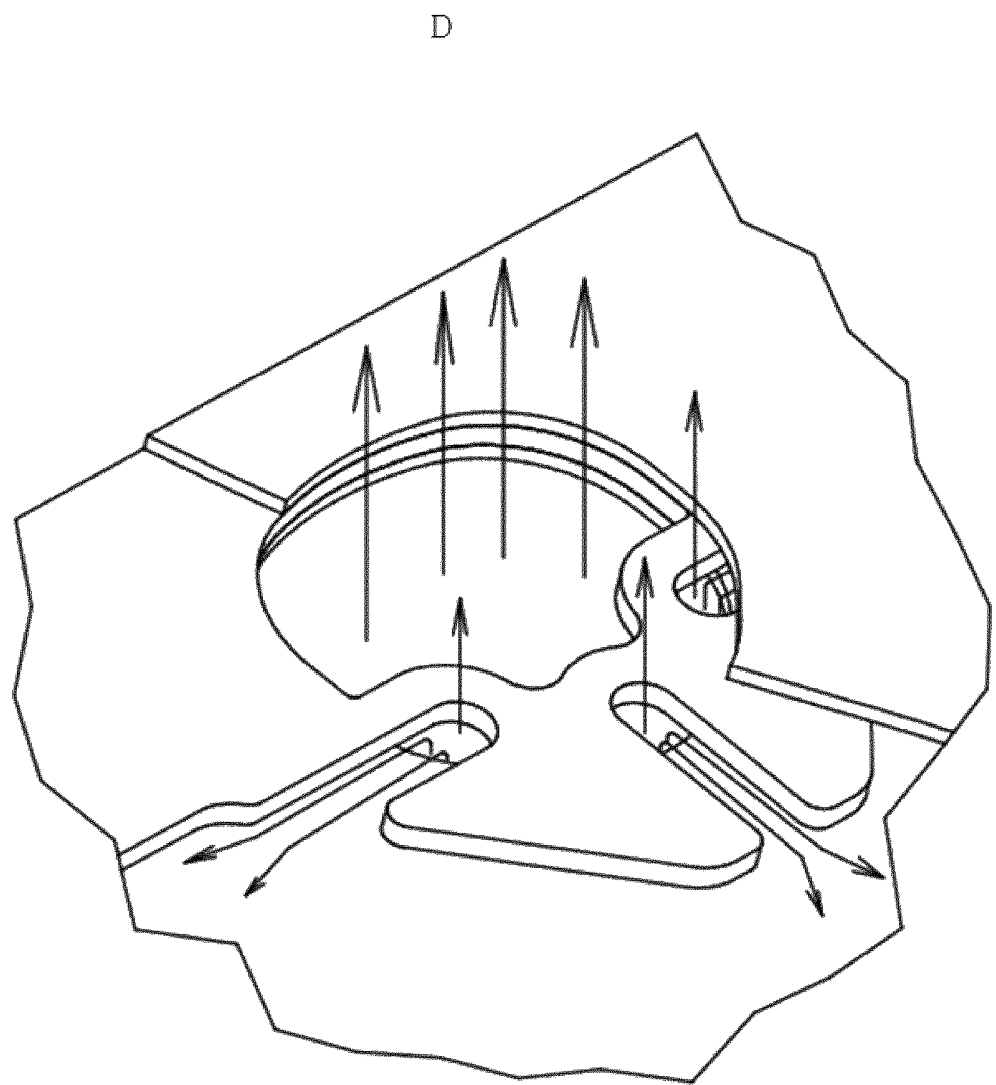
FIG. 6 shows an enlarged view of a part (D) of the repeating element of FIG. 2.

In FIG. 3, a gas inlet of this multi-channel type is shown with the gas flow indicated as arrows. A main part of the gas flow passes the multi-channel inlet and flows further on to the following repeating elements of the cell stack (not shown). But due to the pressure profile of the stack, a part of the gas flow enters the element shown via the multi-channel provided by the wings formed in the spacer as described above. In FIG. 6, view "D" more clearly shows the gas flow paths to the repeating element shown and further on to the following repeating elements (not shown). In FIG. 6 it is clear how the multiple inlet distributes the gas flow into the active area in multiple directions to provide effective and even distribution. Also it is clear how the overlap of the layers provides a multiple inlet without the wings being floating elements even though each layer is entirely cut through, which provides for easy and cheap manufacturing and assembly though obtaining the benefits of the multiple inlet.

The invention claimed is:
1. Solid oxide electrolysis cell stack comprising: a plurality of stacked cell units, each unit comprises a cell layer located between a pair of spaced interconnect layers, wherein said interconnect layers respectively separate one cell unit from an adjacent cell unit in the cell stack, wherein one of said interconnect layers in the at least one cell unit has at least one primary gas inlet opening in flow communication with at least one secondary gas inlet opening in said cell layer, wherein said primary gas inlet opening has a greater cross-sectional flow area than said secondary gas inlet opening which partly overlaps said primary gas inlet opening such that a portion of the flow from the primary gas inlet is blocked and common cross-sectional flow areas of the primary and secondary gas inlet openings define a common gas inlet zone where inlet gas flows from the primary gas inlet opening to the secondary gas inlet opening.

2. Solid oxide electrolysis cell stack according to claim 1, wherein the interconnect layer comprising the at least one primary gas inlet opening and the cell layer comprising the at least one secondary gas inlet opening abut one another.

3. Solid oxide electrolysis cell stack according to claim 1, wherein the cell layer comprising the at least one secondary gas inlet opening further comprise at least one protrusion forming at least one gas inlet flow guide.

4. Solid oxide electrolysis cell stack according to claim 3, wherein said at least one gas inlet flow guide at least partly overlaps a part of said at least one primary gas inlet opening and thereby forms at least one multiple channel gas inlet.

5. Solid oxide electrolysis cell stack according to claim 1, wherein another of said interconnect layers in at least one cell unit has at least one primary gas outlet opening and wherein the cell layer of the same cell unit has at least one secondary gas outlet opening, wherein said primary gas outlet opening and said secondary gas outlet opening partly overlap to define a common cross-sectional flow area lesser in dimension than a cross-sectional flow area of said primary gas outlet opening, the overlap defines a common gas outlet zone where outlet gas flows from the primary gas outlet opening to the secondary gas outlet opening.

6. Solid oxide electrolysis cell stack according to claim 5, wherein the cell layer comprising the at least one secondary gas outlet opening further comprises at least one protrusion forming at least one gas outlet flow guide.

7. Solid oxide electrolysis cell stack according to claim 6, wherein said at least one gas outlet flow guide at least partly overlaps a part of said at least one primary gas outlet opening and thereby forms at least one multiple channel gas outlet.

8. Solid oxide electrolysis cell stack according to claim 1, wherein said unit further comprises at least one spacer layer.

9. Solid oxide electrolysis cell stack according to claim 1, wherein the at least one primary gas inlet opening is a cut through hole, a cut through opening, an indentation or a combination of these.

10. Solid oxide electrolysis cell stack according to claim 1, wherein the at least one secondary gas inlet opening is a cut through hole, a cut through opening, an indentation or a combination of these.

11. Solid oxide electrolysis cell stack according to claim 5, wherein the at least one primary gas inlet opening or the at least one primary gas outlet opening is a cut through hole, a cut through opening, an indentation or a combination of these.

12. Solid oxide electrolysis cell stack according to claim 5, wherein the at least one secondary gas inlet opening or the at least one secondary gas outlet opening is a cut through hole, a cut through opening, an indentation or a combination of these.

\* \* \* \* \*